United States Patent
Shen et al.

(10) Patent No.: US 12,536,782 B2
(45) Date of Patent: Jan. 27, 2026

(54) METHOD AND APPARATUS FOR TRAINING CLASSIFICATION TASK MODEL, DEVICE, AND STORAGE MEDIUM

(71) Applicant: TENCENT TECHNOLOGY (SHENZHEN) COMPANY LIMITED, Guangdong (CN)

(72) Inventors: Rong Bo Shen, Shenzhen (CN); Ke Zhou, Shenzhen (CN); Kuan Tian, Shenzhen (CN); Ke Zhou Yan, Shenzhen (CN); Cheng Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1254 days.

(21) Appl. No.: 17/355,310

(22) Filed: Jun. 23, 2021

(65) Prior Publication Data

US 2021/0319258 A1 Oct. 14, 2021

Related U.S. Application Data (63) Continuation of application No. PCT/CN2020/085006, filed on Apr. 16, 2020.

(30) Foreign Application Priority Data

May 7, 2019 (CN) .......................... 201910377510.3

(51) Int. Cl.
*G06N 3/08* (2023.01)
*G06F 18/214* (2023.01)
(Continued)

(52) U.S. Cl.
CPC ............ *G06V 10/82* (2022.01); *G06F 18/214* (2023.01); *G06F 18/22* (2023.01);
(Continued)

(58) Field of Classification Search
CPC .... G06V 10/82; G06V 10/761; G06V 10/764; G06V 10/7715; G06V 10/774;
(Continued)

(56) References Cited

U.S. PATENT DOCUMENTS 10,769,524 B1 * 9/2020 Natesh ..................... G06F 18/24
10,962,939 B1 * 3/2021 Das ....................... G06F 16/3344
(Continued)

FOREIGN PATENT DOCUMENTS

CA 3066775 A1 * 4/2019 ............. G16B 20/00
CN 108389251 A * 8/2018 ............. G06N 3/045
(Continued)

OTHER PUBLICATIONS

He et al., "Learning from Imbalanced Data", IEEE Transactions on Knowledge and Data Engineering, vol. 21, No. 9, Sep. 2009, pp. 1263-1284 (22 pages total).
(Continued)

*Primary Examiner* — Hassan Mrabi
(74) *Attorney, Agent, or Firm* — Sughrue Mion, PLLC (57) ABSTRACT

Provided are an artificial intelligence (AI)-based method and apparatus for training a classification task model, a device, and a storage medium, which relate to the field of machine learning (ML) technologies. The method includes: training an initial feature extractor by using a first dataset to obtain a feature extractor, the first dataset being a class imbalanced dataset; constructing a generative adversarial network, the generative adversarial network including the feature extractor and an initial feature generator; training the generative adversarial network by using second class samples to obtain a feature generator; constructing a classification task model, the classification task model including the feature generator and the feature extractor; and training the classification task model by using the first dataset, the feature generator being
(Continued)

configured to augment the second class samples in a feature space in a training process of the classification task model.

18 Claims, 7 Drawing Sheets

(51) Int. Cl.
  *G06F 18/22* (2023.01)
  *G06F 18/2431* (2023.01)
  *G06N 3/045* (2023.01)
  *G06V 10/74* (2022.01)
  *G06V 10/764* (2022.01)
  *G06V 10/77* (2022.01)
  *G06V 10/774* (2022.01)
  *G06V 10/82* (2022.01)

(52) U.S. Cl.
  CPC ......... *G06F 18/2431* (2023.01); *G06N 3/045* (2023.01); *G06N 3/08* (2013.01); *G06V 10/761* (2022.01); *G06V 10/764* (2022.01); *G06V 10/7715* (2022.01); *G06V 10/774* (2022.01)

(58) Field of Classification Search
  CPC .... G06F 18/214; G06F 18/22; G06F 18/2431; G06F 18/24; G06N 3/045; G06N 3/08; G06N 3/047; G16H 30/40; G16H 50/20
  See application file for complete search history.

(56) References Cited

U.S. PATENT DOCUMENTS

| | | | | |
|---|---|---|---|---|
| 11,106,903 | B1 * | 8/2021 | Huynh | G06V 10/82 |
| 11,210,783 | B2 * | 12/2021 | Zheng | G06T 11/003 |
| 11,403,876 | B2 * | 8/2022 | Tai | G06T 5/20 |
| 11,688,518 | B2 * | 6/2023 | Soni | G06V 10/7784 382/128 |
| 12,001,959 | B2 * | 6/2024 | Luo | G06V 20/49 |
| 12,277,455 | B2 * | 4/2025 | Walters | H04N 21/8153 |
| 2019/0114511 | A1 * | 4/2019 | Gao | G06F 18/24 |
| 2020/0125836 | A1 * | 4/2020 | Xu | G06F 18/214 |

FOREIGN PATENT DOCUMENTS

| | | | | | |
|---|---|---|---|---|---|
| CN | 108537743 | A | | 9/2018 | |
| CN | 108629314 | A | * | 10/2018 | ............ G06F 18/24 |
| CN | 108734143 | A | * | 11/2018 | ............ G06N 3/045 |
| CN | 108734673 | A | * | 11/2018 | ............ G06N 3/084 |
| CN | 108763874 | A | * | 11/2018 | |
| CN | 108846355 | A | * | 11/2018 | .......... G06V 10/774 |
| CN | 109165666 | A | | 1/2019 | |
| CN | 109300107 | A | * | 2/2019 | ............ G06V 10/82 |
| CN | 109360170 | A | * | 2/2019 | .............. G06T 5/77 |
| CN | 109447149 | A | * | 3/2019 | ............ G16H 50/20 |
| CN | 109522973 | A | | 3/2019 | |
| CN | 109523526 | A | * | 3/2019 | .......... G06T 7/0012 |
| CN | 109784424 | A | * | 5/2019 | ............ G06N 3/088 |
| CN | 109919251 | A | * | 6/2019 | .......... G06V 10/255 |
| CN | 109919252 | A | * | 6/2019 | .......... G06V 10/806 |
| CN | 108388905 | B | * | 7/2019 | .............. G06T 7/90 |
| CN | 110008971 | A | * | 7/2019 | .......... G06V 10/806 |
| CN | 110059465 | A | * | 7/2019 | ............ G06F 21/31 |
| CN | 110097130 | A | | 8/2019 | |
| CN | 110111340 | A | * | 8/2019 | .............. G06T 7/11 |
| CN | 110135579 | A | * | 8/2019 | ............ G06N 3/088 |
| CN | 109617909 | B | * | 4/2021 | ........ G06F 18/2413 |
| CN | 108171112 | B | * | 6/2021 | ............ G06N 3/045 |
| WO | 2017/215284 | A1 | | 12/2017 | |
| WO | 2019/075771 | A1 | | 4/2019 | |
| WO | WO-2019184654 | A1 | * | 10/2019 | ............ G06V 20/49 |
| WO | WO-2020192442 | A1 | * | 10/2020 | .......... G06V 10/806 |

OTHER PUBLICATIONS

Extended European Search Report dated Jun. 1, 2022 from the European Patent Office in EP Application No. 20802264.0.
Translation of Written Opinion dated Jul. 15, 2020 from the International Searching Authority in International Application No. PCT/CN2020/085006.
International Search Report of PCT/CN2020/085006 dated Jul. 15, 2020 [PCT/ISA/210].
Written Opinion of PCT/CN2020/085006 dated Jul. 15, 2020 [PCT/ISA/237].

* cited by examiner

METHOD AND APPARATUS FOR TRAINING CLASSIFICATION TASK MODEL, DEVICE, AND STORAGE MEDIUM

CROSS-REFERENCE TO RELATED APPLICATION(S)

This application is a bypass continuation application of International Application No. PCT/CN2020/085006, filed on Apr. 16, 2020, which claims priority to Chinese Patent Application No. 201910377510.3, filed with the China National Intellectual Property Administration, on May 7, 2019, the disclosures of which are herein incorporated by reference in their entireties.

FIELD

Embodiments of the disclosure relate to the field of machine learning (ML) technologies, and in particular, to the training of a classification task model.

BACKGROUND

Machine learning (ML) has adequate performance in processing classification tasks. For example, a classification task model is constructed based on deep neural networks, and the model is trained based on appropriate training samples. The trained classification task model may be used to process classification tasks such as image recognition and speech recognition.

During the training of a classification task model, classes of training samples included in a training dataset may be imbalanced. For example, a quantity of positive samples is far less than a quantity of negative samples. Such a training dataset may be referred to as a class imbalanced dataset. Using a class imbalanced dataset to train a classification task model may lead to poor performance of the finally obtained classification task model.

SUMMARY

Embodiments of the disclosure provide an artificial intelligence (AI)-based method and apparatus for training a classification task model, a device, and a storage medium, which may be used to resolve the technical problem that a high-precision classification task model cannot be trained by using an upsampling method provided in the related art. The technical solutions provided by the embodiments of the disclosure are as follows:

In an aspect of an example embodiment of the disclosure, a method for training a classification task model is provided in the embodiments of the disclosure. The method is performed by a computer device, and the method includes:

training an initial feature extractor by using a first dataset to obtain a feature extractor, the first dataset being a class imbalanced dataset including first class samples and second class samples, a quantity of the first class samples being greater than a quantity of the second class samples;

constructing a generative adversarial network, the generative adversarial network including the feature extractor and an initial feature generator, the initial feature generator being configured to generate a feature vector of a same dimension as the feature extractor;

training the generative adversarial network by using the second class samples to obtain a feature generator;

constructing a classification task model, the classification task model including the feature generator and the feature extractor; and training the classification task model by using the first dataset, the feature generator being configured to augment the second class samples in a feature space in a training process of the trained classification task model.

According to an aspect of an example embodiment of the disclosure, an apparatus for training a classification task model is provided in the embodiments of the disclosure, the apparatus including:

at least one memory configured to store program code; and at least one processor configured to read the program code and operate as instructed by the program code, the program code including:

first training code configured to cause the at least one processor to train an initial feature extractor by using a first dataset to obtain a feature extractor, the first dataset being a class imbalanced dataset including first class samples and second class samples, a quantity of the first class samples being greater than a quantity of the second class samples;

first construction code configured to cause the at least one processor to construct a generative adversarial network, the generative adversarial network including the feature extractor and an initial feature generator, the initial feature generator being configured to generate a feature vector of a same dimension as the feature extractor;

second training code configured to cause the at least one processor to train the generative adversarial network by using the second class samples to obtain a feature generator;

second construction code configured to cause the at least one processor to construct a classification task model, the classification task model including the feature generator and the feature extractor; and third training code configured to cause the at least one processor to train the classification task model by using the first dataset, the feature generator being configured to augment the second class samples in a feature space in a training process of the trained classification task model.

In an aspect of an example embodiment of the disclosure, a computer device is provided in the embodiments of the disclosure, including:

a processor, a communication interface, a memory, and a communication bus, the processor, the communication interface, and the memory communicating with each other by using the communication bus; and the communication interface being an interface of a communication module;

the memory being configured to store a program code and transmit the program code to the processor; and the processor being configured to call instructions of the program code in the memory to perform the method for training a classification task model in the foregoing aspect(s).

According to an aspect of an example embodiment of the disclosure, a computer device is provided, including at least one processor and at least one memory storing program code, the program code being executable by the at least one processor to perform the method in the foregoing aspect(s).

According to an aspect of an example embodiment of the disclosure, a non-transitory computer-readable storage medium is provided in the embodiments of the disclosure, the storage medium being configured to store a computer program, the computer program being configured to perform the method for training a classification task model in the foregoing aspect(s).

According to an aspect of an example embodiment of the disclosure, a computer program product including instructions is provided in the embodiments of the disclosure, the instructions, when running on a computer, causing the computer to perform the method for training a classification task model in the foregoing aspect(s).

BRIEF DESCRIPTION OF THE DRAWINGS

To describe the technical solutions of the example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts.

DETAILED DESCRIPTION

To make the objectives, technical solutions, and advantages of the disclosure clearer, the following further describes implementations of the disclosure in detail with reference to the accompanying drawings.

According to the technical solution provided in the embodiments of the disclosure, a feature generator is trained based on a generative adversarial network, and minority class samples (that is, training samples of a relatively small quantity in a class imbalanced dataset) are augmented in a feature space by using the feature generator. Augmentation is performed at a feature level instead of simply duplicating minority class samples by upsampling, so that a finally trained classification task model is prevented from overfitting and the accuracy of the final trained classification task model is improved.

In the embodiments of the disclosure, machine learning (ML) in AI technologies and deep learning (DL) in ML are involved, including various types of artificial neural networks (ANNs).

AI is a theory, method, technology and application system that uses digital computers or machines controlled by digital computers to simulate, extend and expand human intelligence, perceive the environment, acquire knowledge, and use knowledge to obtain the best results. In other words, AI is a comprehensive technology of computer science. AI attempts to understand the essence of intelligence and produce a new kind of intelligent machine that may react in a similar way to human intelligence. AI is to study the design principles and implementation methods of various intelligent machines, so that the machines have the functions of perception, reasoning and decision-making.

AI technology is a comprehensive discipline, covering a wide range of fields, including both hardware-level technology and software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and ML/DL.

In the embodiments of the disclosure, a computer device that performs the method for training a classification task model may have ML capabilities, so as to train the classification task model through the ML capabilities.

ML is an interdisciplinarity, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. ML and DL usually include technologies such as an ANN.

The classification task model involved in the embodiments of the disclosure is an ML model obtained through ML training and configured to process classification tasks. The classification task model may be a DL classification task model, that is, a classification task model constructed based on a deep neural network, for example, a classification task model constructed based on a deep convolutional neural network. For example, the classification task model may be configured to process lesion recognition and classification tasks in medical images, and may be configured to process classification tasks such as image recognition and speech recognition. The specific application scenarios of the classification task model are not limited in the embodiments of the disclosure.

In the method provided in the embodiments of the disclosure, the operations may be performed by a computer device. The computer device is an electronic device such as a personal computer (PC) or a server with data calculation, processing, and storage capabilities.

Figure 1:
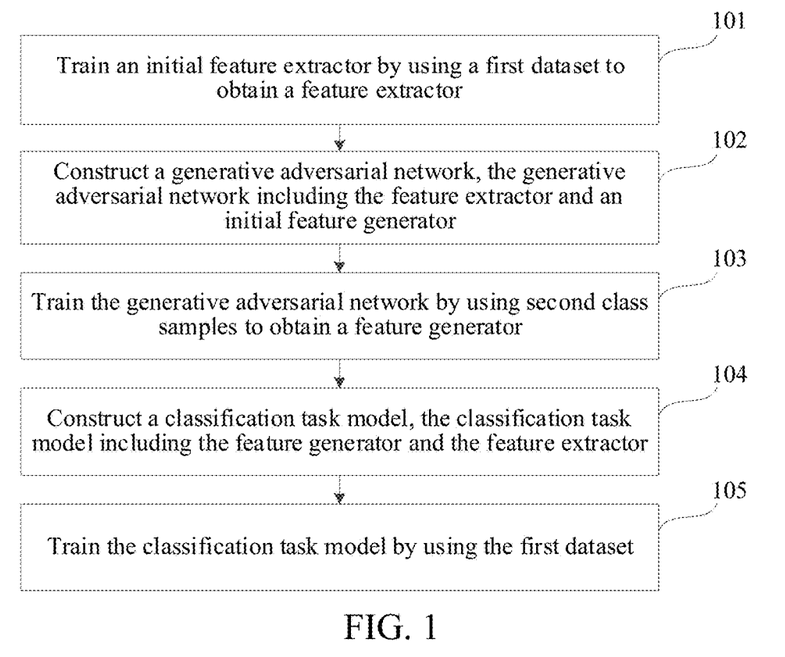
FIG. 1 is a flowchart of a method for training a classification task model according to an embodiment of the disclosure.

FIG. 1 is a flowchart of a method for training a classification task model according to an embodiment of the disclosure. The method may include the following operations (101 to 105):

Operation 101: Train an initial feature extractor by using a first dataset to obtain a feature extractor, the first dataset being a class imbalanced dataset including first class samples and second class samples, a quantity of the first class samples being greater than a quantity of the second class samples.

The first class samples and the second class samples are two different classes of samples in the first dataset. For example, the first class samples are positive samples, and the second class samples are negative samples. Alternatively, the first class samples are negative samples, and the second class samples are positive samples. The quantity of the first class samples is greater than the quantity of the second class samples. That is, the first class samples may be referred to as majority class samples, and the second class samples may be referred to as minority class samples. In most scenarios, a quantity of the negative samples is larger or even much larger than a quantity of the positive samples. Therefore, the first class samples may be negative samples, and correspondingly the second class samples are positive samples.

The feature extractor is the part configured to extract sample features in the classification task model, and the feature extractor is also referred to as an encoder. The classification task model includes a feature extractor and a classifier. An output end of the feature extractor is connected to an input end of the classifier. The feature extractor extracts a feature vector from an inputted sample of the model, and the classifier is configured to determine a class of the inputted sample according to the feature vector. The classification task model for image recognition is used as an example. The feature extractor is configured to perform mapping encoding on an inputted image, and output a feature vector with dimensions much fewer than those of pixels of the inputted image. The feature extractor obtains a non-linear, local to global feature mapping, which combines low-level visual features and high-level semantic information.

In an example embodiment, the classification task model is constructed based on a deep convolutional neural network, and the feature extractor may include a plurality of convolutional layers. For example, the classification task model is an Inception-v3 model. The Inception-v3 model is a deep neural network model, which has adequate performance on image classification tasks. In addition, another advantage of the Inception-v3 model is that a pre-trained Inception-v3 model may be used as an initialized classification task model without having to initialize parameters of the classification task model randomly, which improves the model training efficiency. The classifier may adopt a normalized exponential function (softmax) classifier or other classifiers, which is not limited in the embodiments of the disclosure.

In an example embodiment, operation 101 includes the following sub-operations:

1. Construct an initial classification task model, the initial classification task model including the initial feature extractor and an initial classifier.

As described above, the initial classification task model may be a pre-trained Inception-v3 model.

2. Train the initial classification task model by using the first dataset to obtain the feature extractor, the feature extractor being obtained by the initial feature extractor through the foregoing initial training.

The first dataset includes first class samples and second class samples, and each training sample has a corresponding label according to a class thereof. For example, a label of the first class samples is 1, and a label of the second class samples is 0. Alternatively, a label of the first class samples is 0, and a label of the second class samples is 1. Training samples (including the first class samples and the second class samples) in the first dataset are inputted into the initial classification task model, classification results outputted by the model are compared with the labels, and a loss function value corresponding to the model is calculated. A back-propagation algorithm is then used to calculate gradients of parameters in the model according to the loss function value. Finally, the gradients are used to update the parameters in the model, and a pace of the update is controlled by a learning rate. The loss function may be a cross entropy (CE) loss function.

If the initial classification task model meets a training stop condition, the training of the model is stopped, and a classification task model after the initial training is obtained. The classification task model after the initial training includes a feature extractor after the initial training. The feature extractor after the initial training is used in a generative adversarial network described below. The training stop condition of the initial classification task model may be set in advance. For example, the accuracy of the model reaches a preset requirement, the quantity of training rounds reaches a preset quantity of rounds, or a length of training time reaches a preset length of time, which is not limited in the embodiments of the disclosure.

Figure 2:
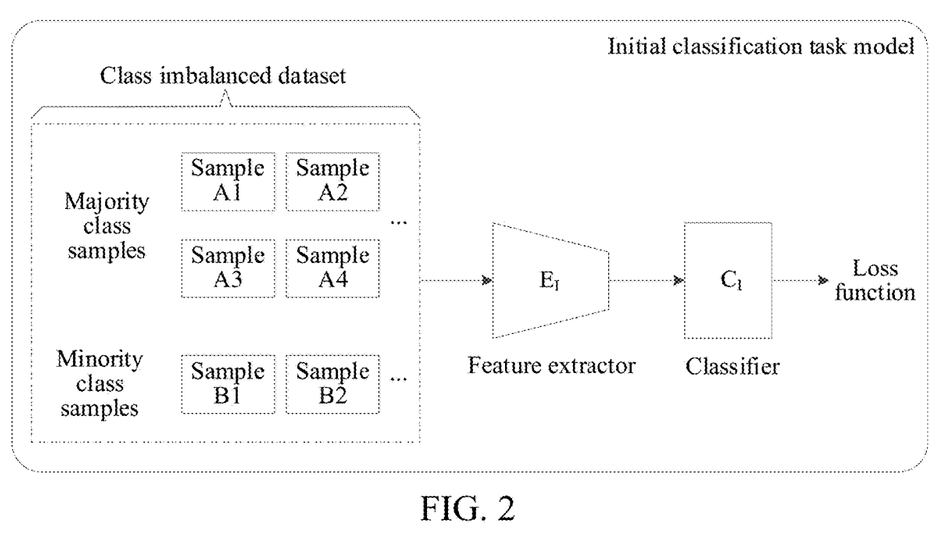
FIG. 2 is a schematic structural diagram of an initial classification task model according to an embodiment of the disclosure.

FIG. 2 is a schematic structural diagram of an initial classification task model according to an example embodiment. The initial classification task model includes a feature extractor $E_I$ and a classifier $C_I$. An input end of the feature extractor $E_I$ is an input end of the model. An output end of the feature extractor $E_I$ is connected to an input end of the classifier $C_I$. An output end of the classifier $C_I$ is an output end of the model. The initial classification task model is trained by using the first dataset (including majority class samples and minority class samples) to obtain a classification task model after the initial training. The classification task model after the initial training includes a feature extractor $E_I$ after the initial training and a classifier $C_I$ after the initial training.

Operation 102: Construct a generative adversarial network, the generative adversarial network including the feature extractor and an initial feature generator.

In the generative adversarial network, an output end of the feature generator and an output end of the feature extractor are separately connected to an input end of the domain classifier.

The feature extractor is the feature extractor obtained after the initial training of the initial feature extractor in operation 101.

The initial feature generator is configured to generate a feature vector of the same dimension as the feature extractor. For example, if dimensions of a feature vector outputted by the feature extractor are 20, dimensions of a feature vector generated by the initial feature generator are also 20. The initial feature generator may be alternatively constructed by using a plurality of convolutional layers. If the initial feature generator includes six convolutional layers, sizes of convolution kernels of the first five convolutional layers are 3×3, and a size of a convolution kernel of the last convolutional layer is 1×1. The quantity of corresponding outputted feature maps for each convolutional layer is 64, 128, 256, 512, 1024, and 2048 respectively. Each convolutional layer may be followed by a batch norm layer and an activation function layer, such as a rectified linear unit (ReLU) layer.

In an example embodiment, the generative adversarial network may further include a domain classifier, and the domain classifier is configured to distinguish between feature vectors outputted by the feature extractor and feature vectors outputted by the initial feature generator. The domain classifier adjusts the initial feature generator through adversarial learning, so that a feature vector outputted by the domain classifier is as close as possible to the feature vector outputted by the feature extractor. Through such an adversarial learning process, model parameters of minimax game equilibrium are found.

Operation 103: Train the generative adversarial network by using the second class samples to obtain a feature generator.

In the process of training the generative adversarial network, parameters of the feature extractor are fixed, that is, the parameters of the feature extractor are not updated. Input of the feature extractor is second class samples, that is, minority class samples, and output is a feature vector extracted from the second class samples.

Input of the initial feature generator includes a superposition of a priori data and noisy data, and output is a feature vector of the same dimension as the feature extractor. The a priori data may be extracted from the second class samples of the first dataset, or may be extracted from samples in a second dataset that are of the same class as the second class samples. The second dataset may be another dataset different from the first dataset in the same task. The noisy data may be random noisy data. An image with a priori data of 64×64 is used as an example. Noisy data may be alternatively a 64×64 image, but pixel values of pixels in the image of the noisy data are randomly generated. The superposition of the a priori data and the noisy data is to perform a weighted summation of pixel values of pixels at the same position in the a priori data and in the noisy data, to finally obtain a superimposed image.

The initial feature generator extracts the feature vector from the superimposed image. In addition, considering that the quantity of network layers of the feature generator may be small, the input cannot be excessively large. Therefore, the a priori data may be a small-sized sample image obtained after a sample image is scaled down, for example, a 64×64 sample image.

In the embodiments of the disclosure, in an example embodiment, the input of the initial feature generator is not completely noisy data. If the feature vector similar to a real sample is completely generated from noisy data, there is a lack of effective constraint. Therefore, the input of the initial feature generator is a superposition of a priori data and noisy data, which may suppress problems of non-convergence and potential failure in the training process of the generative adversarial network, and increase the robustness of the generative adversarial network.

In an example embodiment, operation 103 includes the following sub-operations:
1. Perform a first parameter update and a second parameter update in each round of training of the generative adversarial network, the first parameter update including: assigning a first label to input of the feature extractor, and assigning a second label to input of the initial feature generator.
2. Calculate a first loss function value of the domain classifier.
3. Update parameters of the domain classifier according to the first loss function value.
4. The second parameter update includes: blocking the input of the feature extractor, and assigning the first label to the input of the initial feature generator.
5. Calculate a second loss function value of the domain classifier.
6. Update parameters of the initial feature generator according to the second loss function value.

In a training process of the generative adversarial network, the initial feature generator and the domain classifier compete with each other. That is, two backpropagation calculations are performed in each round of training. In the first backpropagation calculation, parameters of the initial feature generator are fixed, and parameters of the domain classifier are updated. In the second backpropagation calculation, the parameters of the domain classifier are fixed, and the parameters of the initial feature generator are updated. The first label and the second label are two different labels. For example, the first label is 1, and the second label is 0. Alternatively, the first label is 0 and the second label is 1.

For example, a label of 1 is assigned to the input of the feature extractor, and a label of 0 is assigned to the input of the initial feature generator. A first loss function value of the domain classifier is calculated, and the parameters of the domain classifier are adjusted by backpropagation according to the first loss function value. Next, the input of the feature extractor is blocked, the label of 1 is assigned to the input of the initial feature generator, a second loss function value of the domain classifier is calculated, and the parameters of the initial feature generator are adjusted by backpropagation according to the second loss function value.

Figure 3:
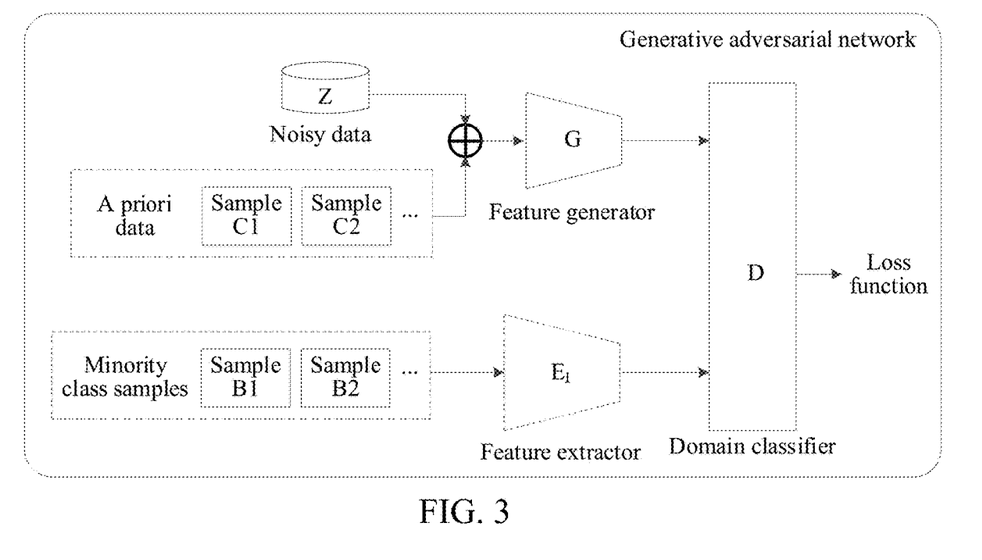
FIG. 3 is a schematic structural diagram of a generative adversarial network according to an embodiment of the disclosure.

FIG. 3 is a schematic structural diagram of a generative adversarial network according to an example embodiment. The generative adversarial network includes a feature extractor $E_I$, a feature generator (or initial feature generator) G, and a domain classifier D. An output end of the feature extractor $E_I$ and an output end of the feature generator G are separately connected to an input end of the domain classifier D. Input of the feature generator G is a superposition of a priori data and noisy data, and input of the feature extractor $E_I$ is minority class samples in a first dataset. The feature generator G is used in the following classification task model.

Operation 104: Construct a classification task model, the classification task model including the feature generator and the feature extractor. The classification task model may further include a classifier.

In the classification task model, an output end of the feature generator and an output end of the feature extractor are separately connected to an input end of the classifier.

The feature generator is the feature generator obtained through the training by the generative adversarial network in operation 103. The feature extractor and the classifier in this operation adopt the same structure and configuration as the initial classification task model in operation 101. In an embodiment, the feature extractor in this operation is initialized with the parameters of the feature extractor trained in operation 101.

Operation 105: Train the classification task model by using the first dataset, the feature generator being configured to augment second class samples in a feature space.

In a process of training the classification task model, with an original class imbalanced first dataset, the feature generator trained by using the generative adversarial network is used to augment minority class samples in the feature space and transform a class imbalanced learning task to a class balanced learning task, to obtain a classification task model through retraining.

In an example embodiment, the classification task model further includes a data cleaning unit, and an abnormal feature vector outputted by the feature generator and the feature extractor is filtered out by using the data cleaning unit. The data cleaning unit may be a functional unit realized by software, hardware, or a combination of software and hardware. Some abnormal feature vectors generated by the feature generator are suppressed by using appropriate data cleaning technology (such as a Tomek Link algorithm), so that the accuracy of the final trained classification task model is further improved.

In an example embodiment, by using the data cleaning unit from the feature vectors outputted by the feature generator and the feature extractor, a feature vector pair that meets a preset condition may be selected, the feature vector pair that meets the preset condition being two feature vectors with different labels and a similarity that conforms to a threshold, for example, one group of feature vectors with the highest similarity or a plurality of groups of feature vectors with relatively a high similarity.

Next, the feature vector pair that meets the preset condition is filtered out as the abnormal feature vectors. The similarity between two feature vectors may be calculated by using a Euclidean distance algorithm or other similarity algorithms, which is not limited in the embodiments in the disclosure. For example, for all feature vectors outputted by the feature generator and the feature extractor, all the feature vectors are traversed. For each feature vector, another feature vector that is most similar to the feature vector is found, and labels of the two feature vectors are compared to determine whether the labels are the same. If the labels of the two feature vectors are different, for example, if the label of one feature vector is 1, and the label of the other is 0, the two feature vectors are a feature vector pair that meets a preset condition, and the two feature vectors are filtered out as abnormal feature vectors.

Figure 4:
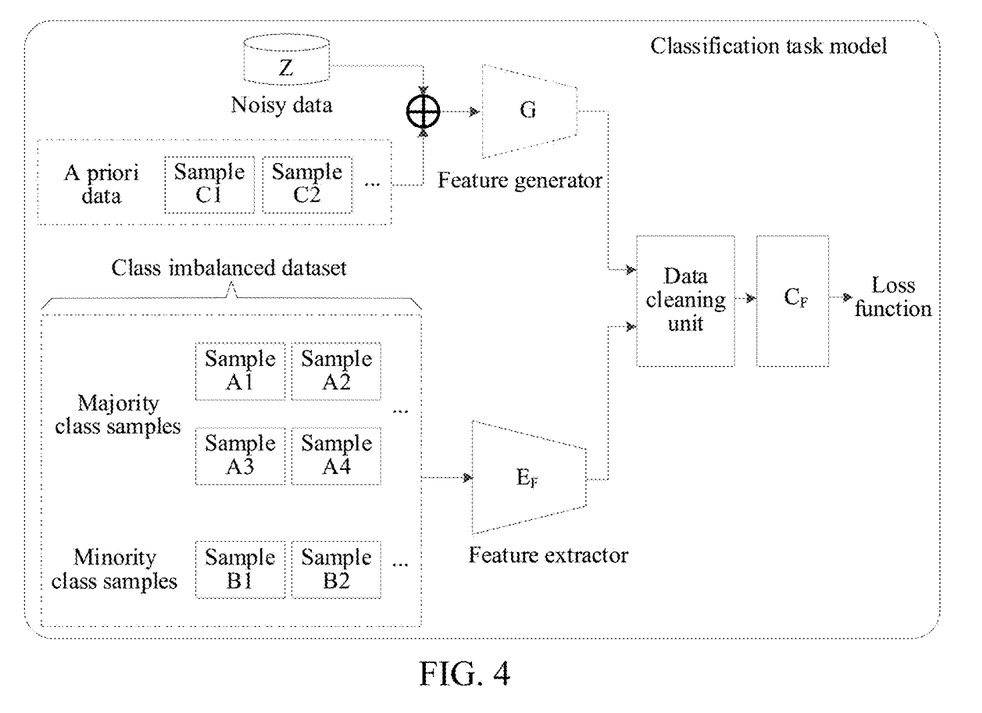
FIG. 4 is a schematic structural diagram of a classification task model according to an embodiment of the disclosure.

FIG. 4 is a schematic structural diagram of a classification task model according to an example embodiment. The classification task model includes a feature generator G, a feature extractor $E_F$, a classifier $C_F$, and a data cleaning unit. An output end of the feature generator G and an output end of the feature extractor $E_F$ are separately connected to an input end of the data cleaning unit, and an output end of the data cleaning unit is connected to an input end of the classifier $C_F$. The feature extractor $E_F$ has the same structure and configuration as the feature extractor $E_I$ in the classification task model shown in FIG. 2, and the classifier $C_F$ has the same structure and configuration as the classifier $C_I$ in the classification task model shown in FIG. 2. The first dataset (including majority class samples and minority class samples) is used to train the classification task model. When a preset training stop condition is met, the training of the classification task model is stopped, to obtain the classification task model. The preset training stop condition may be that, for example, the accuracy of the model reaches a preset requirement, the quantity of training rounds reaches a preset quantity of rounds, or a length of training time reaches a preset length of time, which is not limited in the embodiments of the disclosure.

According to the technical solution provided in the embodiments of the disclosure, a feature generator is trained based on a generative adversarial network, and minority class samples (that is, training samples of a relatively small quantity in a class imbalanced dataset) are augmented in a feature space by using the feature generator. Augmentation is performed at a feature level instead of simply duplicating minority class samples by upsampling, so that a finally trained classification task model is prevented from overfitting and the accuracy of the final trained classification task model is improved.

In addition, according to the technical solution provided in the embodiments of the disclosure, in the process of training the classification task model, an abnormal feature vector outputted by the feature generator and the feature extractor is further filtered out by using the data cleaning unit, so that some abnormal feature vectors generated by the feature generator are suppressed, thereby further improving the accuracy of the classification task model finally obtained through training.

In addition, in the embodiments of the disclosure, the input of the feature generator is not completely noisy data. If the feature vector similar to a real sample is completely generated from noisy data, there is a lack of effective constraint. Therefore, the input of the feature generator is a superposition of a priori data and noisy data, which may suppress problems of non-convergence and potential failure in the training process of the generative adversarial network, and increase the robustness of the generative adversarial network.

Figure 5:
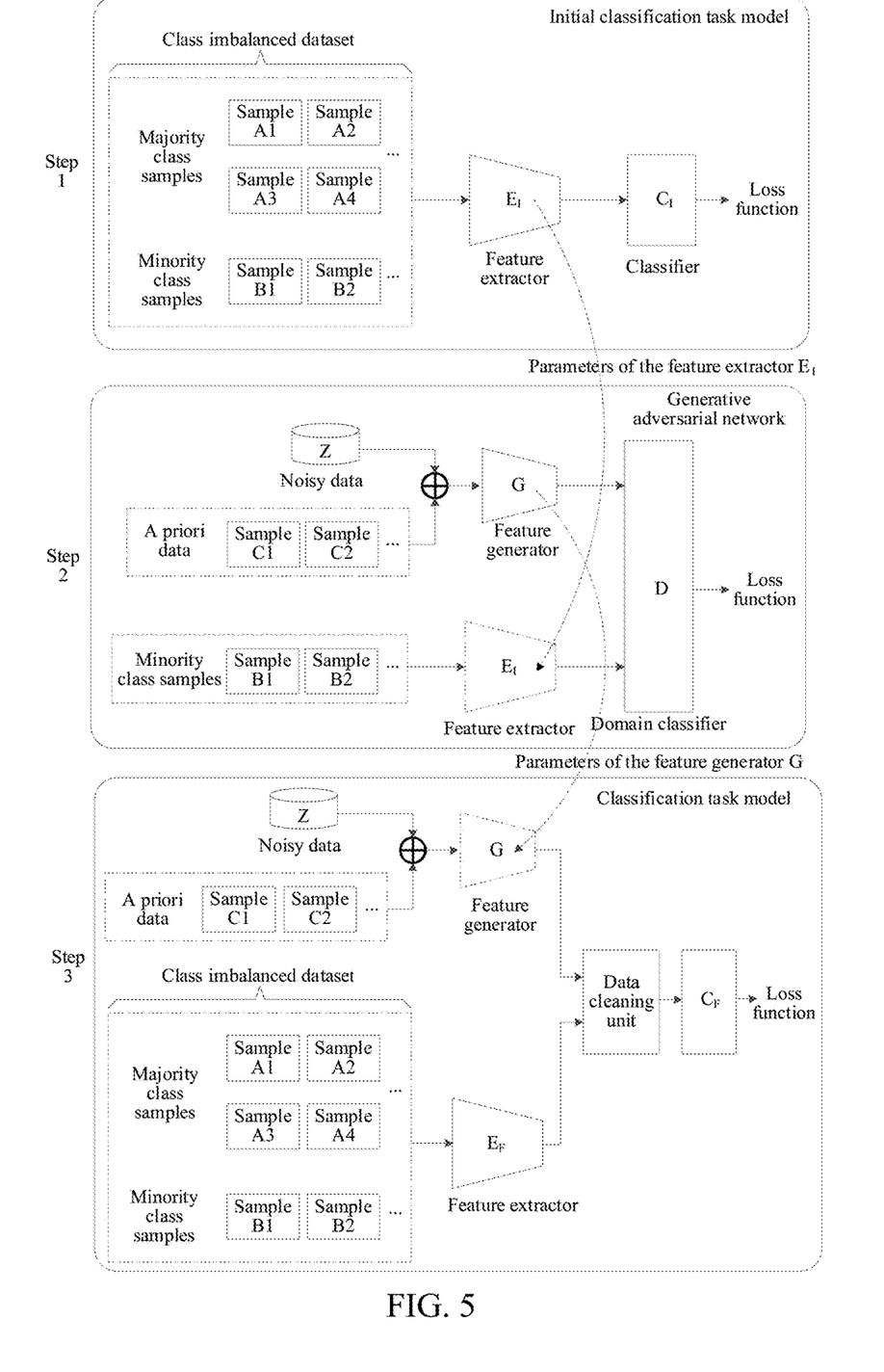
FIG. 5 is an overall architectural diagram illustrating training a classification task model according to an embodiment of the disclosure.

FIG. 5 is an overall architectural diagram illustrating training a classification task model according to an embodiment of the disclosure. Referring to FIG. 5, the training process of the classification task model provided in the embodiments of the disclosure may include the following three steps:

Step 1: Train an Initial Feature Extractor.

In this operation, an initial classification task model is constructed, including a feature extractor (or an initial feature extractor) $E_I$ and a classifier $C_I$, and the initial classification task model is trained by using a class imbalanced dataset to obtain a feature extractor $E_I$.

Step 2: Train a Feature Generator.

In this operation, a generative adversarial network is constructed, including the feature extractor $E_I$ after the initial training, an initial feature generator G, and a domain classifier D. In the training process, parameters of the feature extractor $E_I$ are fixed, and the feature generator G is obtained by training the generative adversarial network.

Step 3: Train a Final Classification Task Model.

In this operation, a classification task model is constructed, including a feature generator G, a feature extractor $E_F$, a data cleaning unit, and a classifier $C_F$. In the training process, parameters of the feature generator G are fixed, with an original class imbalanced dataset, the feature generator G is used to augment minority class samples in the feature space and transform a class imbalanced learning task to a class balanced learning task, to obtain a final classification task model through training.

The technical solution provided in the embodiments of the disclosure is applicable to a model training process of an ML classification task in the AI field, and is particularly suitable for a training process of a classification task model with a training dataset being a class imbalanced dataset. A classification task of a class imbalanced medical image is used as an example. A training dataset may include a plurality of sub-images extracted from the medical image. Some of the sub-images are positive samples (that is, images of lesion regions), and some are negative samples (that is, images of non-lesion regions). A quantity of the negative samples is often much larger than a quantity of the positive samples. In an example scenario of the disclosure, the classification task model may be used as a radiology lesion determining model. Input of the model is a sub-image extracted from a medical image, and output is a result of determination as to whether the sub-image is a lesion region. A feature generator is obtained by training a generative adversarial network, the feature generator is used to augment minority class sample in a feature space, and finally a more accurate radiology lesion determining model is trained to assist a doctor in diagnosis and analysis of lesions, for example, detection and analysis of lumps in a mammography image.

The technical solution of the embodiments of the disclosure was tested on a dataset including 2194 mammography images and a Camelyon 2016 pathology image dataset. Regions of interest (ROI) are extracted from the images to obtain a set of sub-images, and imbalance ratios of 1:10 and 1:20 are used respectively. Test results are shown in Table-1 and Table-2 below.

TABLE 1

| Class imbalanced ratio | Evaluation indicator | Solution 1 | Solution 2 | Solution 3 | Solution 4 | Solution 5 | Solution 6 |
| --- | --- | --- | --- | --- | --- | --- | --- |
| 1:10 | Acc | 0.8379 | 0.8555 | 0.8287 | 0.8423 | 0.8430 | 0.8665 |
|  | AUC | 0.8452 | 0.8878 | 0.8204 | 0.9071 | 0.9082 | 0.9083 |
| 1:20 | Acc | 0.8087 | 0.8180 | 0.8047 | 0.8125 | 0.8070 | 0.8258 |
|  | AUC | 0.7797 | 0.8417 | 0.7798 | 0.8453 | 0.8587 | 0.8704 |

TABLE 2

| Class imbalanced ratio | Evaluation indicator | Solution 1 | Solution 2 | Solution 3 | Solution 4 | Solution 5 | Solution 6 |
| --- | --- | --- | --- | --- | --- | --- | --- |
| 1:10 | Acc | 0.8999 | 0.9243 | 0.8882 | 0.9062 | 0.9023 | 0.9307 |
|  | AUC | 0.9157 | 0.9417 | 0.9047 | 0.9597 | 0.9601 | 0.9615 |
| 1:20 | Acc | 0.8516 | 0.8887 | 0.8506 | 0.8760 | 0.8809 | 0.9043 |
|  | AUC | 0.8921 | 0.9175 | 0.8764 | 0.9521 | 0.9424 | 0.9459 |

Table-1 shows test results of a mammography image dataset, and Table-2 shows test results of a Camelyon 2016 pathology image dataset.

In Table-1 and Table-2, Solution 1 represents that no processing is performed on the datasets. Solution 2 represents that the datasets are downsampled. Solution 3 represents that the datasets are upsampled. Solution 4 represents that the datasets are augmented in a sample space. Solution 5 represents that the datasets are augmented in a feature space by using the technical solution of the disclosure and a data cleaning operation is not included. Solution 6 represents that the datasets are augmented in a feature space by using the technical solution of the disclosure and a data cleaning operation is included.

In Table-1 and Table-2, Acc (accuracy) and AUC (area under the ROC curve) are both model evaluation parameters. Acc represents an accuracy of a finally trained classification task model. When Acc is larger, the model has better performance, and when Acc is smaller, the model has worse performance. AUC represents an area under the receiver operating characteristic (ROC) curve. AUC intuitively reflects a classification ability expressed by the ROC curve. When AUC is larger, the model has better performance, and when AUC is smaller, the model has worse performance.

Figure 6:
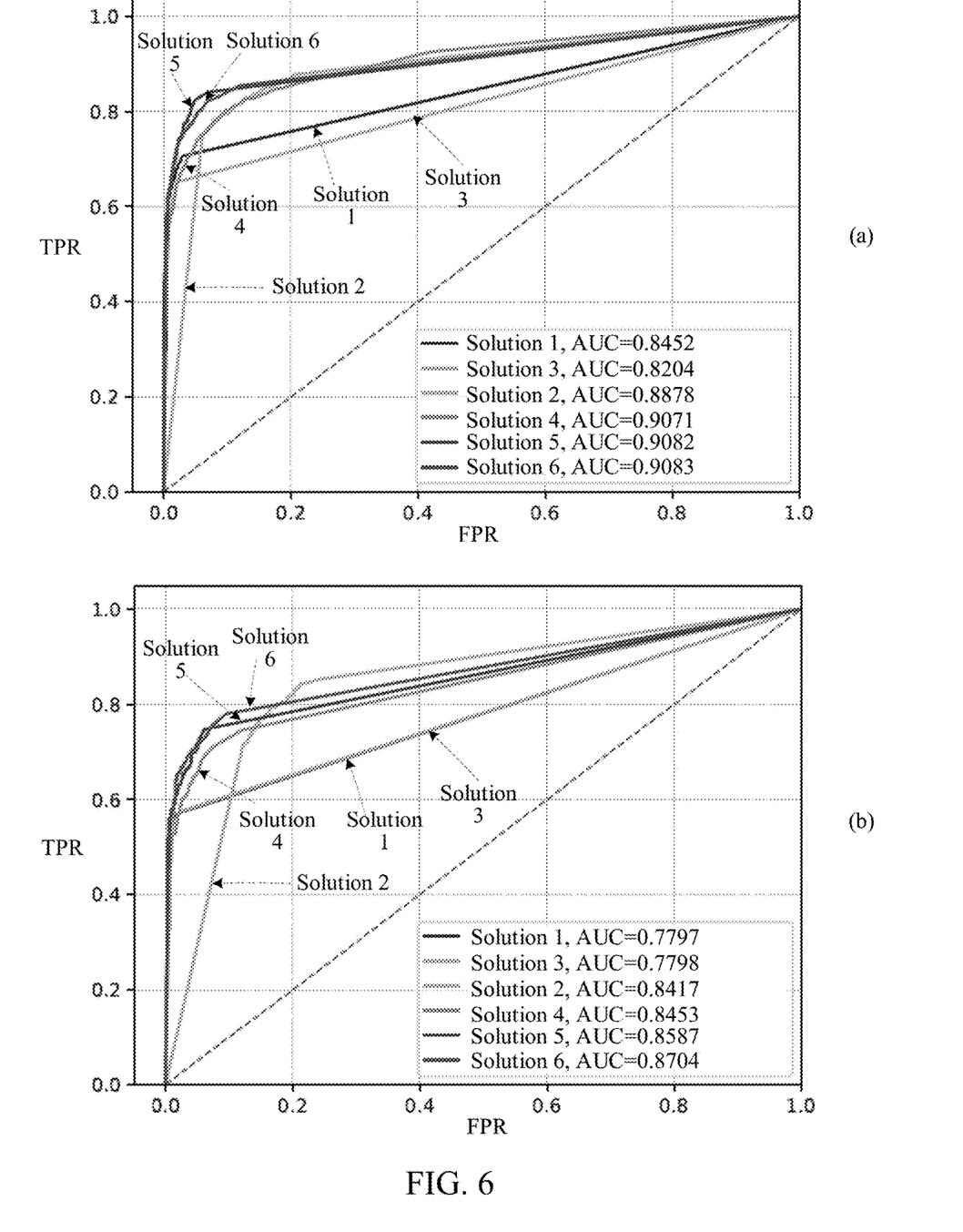
FIG. 6 and FIG. 7 are schematic diagrams illustrating experimental results on comparative examples and solutions according to example embodiments of the disclosure.

The part (a) in FIG. 6 shows ROC curves and corresponding AUC values of the six solutions in the mammography image datasets, with the class imbalance ratio of 1:10. The part (b) in FIG. 6 shows ROC curves and corresponding AUC values of the six solutions in the mammography image datasets, with the class imbalance ratio of 1:20.

Figure 7:
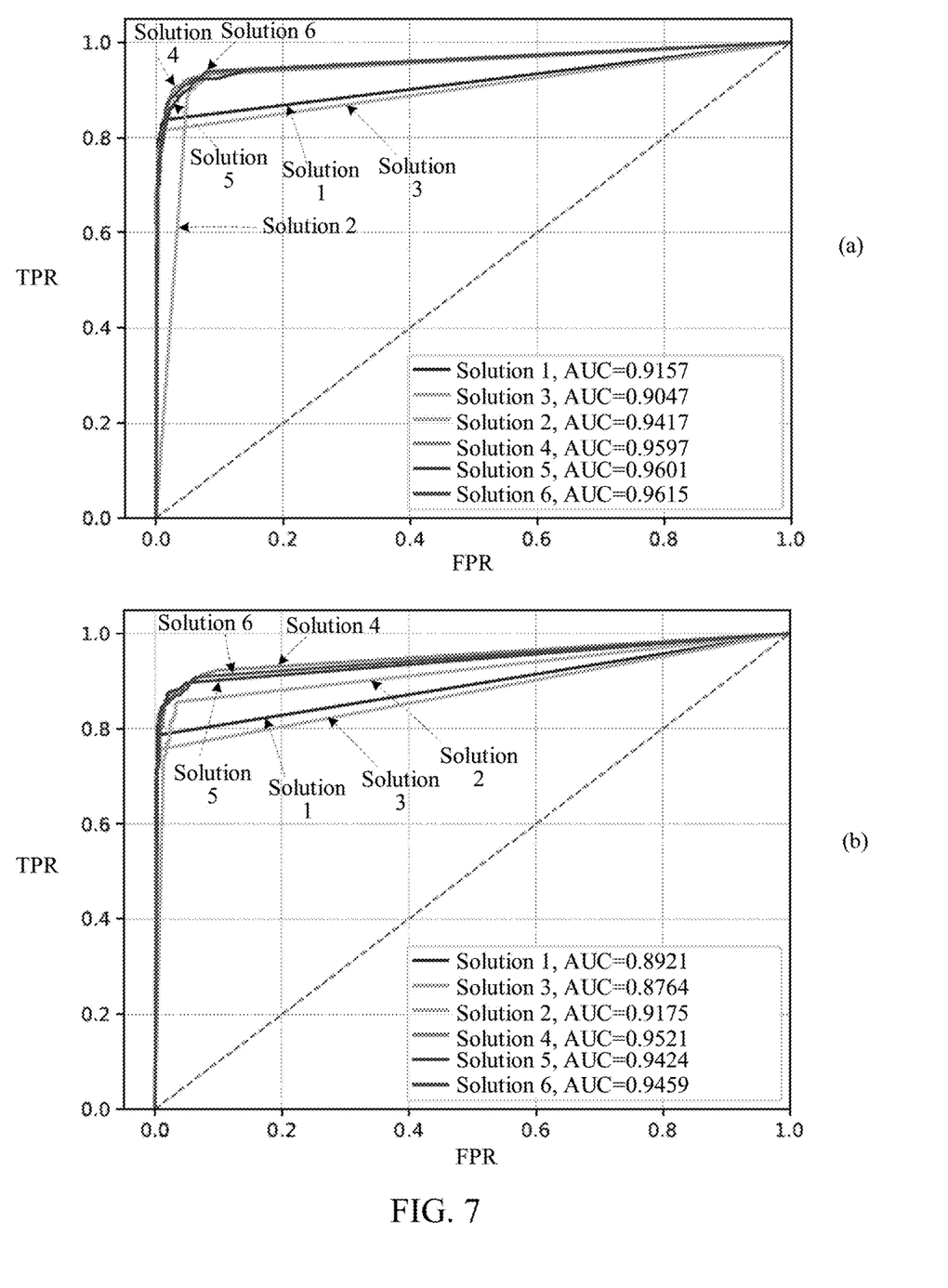

The part (a) in FIG. 7 shows ROC curves and corresponding AUC values of the six solutions in the Camelyon 2016 pathology image datasets, with the class imbalance ratio of 1:10. The part (b) in FIG. 7 shows ROC curves and corresponding AUC values of the six solutions in the Camelyon 2016 pathology image datasets, with the class imbalance ratio of 1:20.

It can be seen from graphs of the test results that the technical solution of the disclosure achieves better performance than other solutions such as upsampling, downsampling, and sample space augmentation technologies. In addition, based on the data cleaning operation according to an example embodiment, the solution may further improve the performance of the classification task model obtained by the final training.

The following describes apparatus embodiments of the disclosure, which may be used for executing the method embodiments of the disclosure. For details not disclosed in the apparatus embodiments of the disclosure, refer to the method embodiments of the disclosure.

Figure 8:
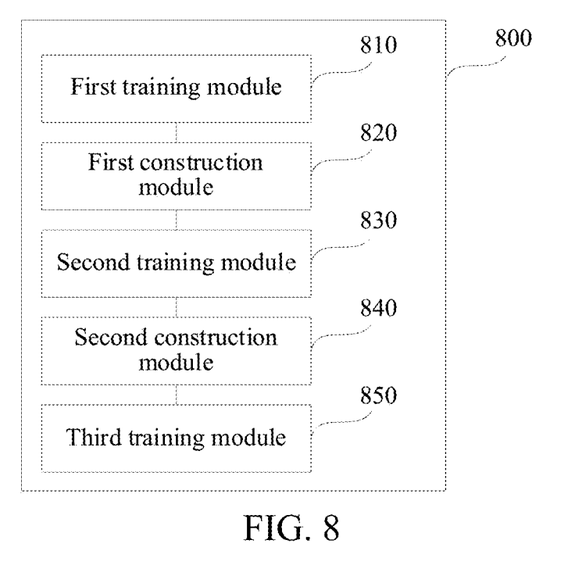
FIG. 8 is a block diagram of an apparatus for training a classification task model according to an embodiment of the disclosure.

FIG. 8 is a block diagram of an apparatus for training a classification task model according to an embodiment of the disclosure. The apparatus has functions of implementing the foregoing method examples. The functions may be implemented by using software or hardware, or may be implemented by hardware executing corresponding software. The apparatus may be a computer device or may be disposed in a computer device. The apparatus 800 may include: a first training module 810, a first construction module 820, a second training module 830, a second construction module 840, and a third training module 850.

The first training module 810 is configured to train an initial feature extractor by using a first dataset to obtain a feature extractor, the first dataset being a class imbalanced dataset including first class samples and second class samples, a quantity of the first class samples being greater than a quantity of the second class samples. For example, the first dataset may be determined according to medical images.

The first construction module 820 is configured to construct a generative adversarial network, the generative adversarial network including the feature extractor and an initial feature generator, the initial feature generator being configured to generate a feature vector of the same dimension as the feature extractor.

The second training module 830 is configured to train the generative adversarial network by using the second class samples to obtain a feature generator.

The second construction module 840 is configured to construct a classification task model, the classification task model including the feature generator and the feature extractor.

The third training module 850 is configured to train the classification task model by using the first dataset, the feature generator being configured to augment the second class samples in a feature space in a training process.

According to the technical solution provided in the embodiments of the disclosure, a feature generator is trained based on a generative adversarial network, and minority class samples (that is, training samples of a relatively small quantity in a class imbalanced dataset) are augmented in a feature space by using the feature generator. Augmentation is performed at a feature level instead of simply duplicating minority class samples by upsampling, so that a finally trained classification task model is prevented from overfitting and the accuracy of the final trained classification task model is improved.

In an example embodiment, the generative adversarial network further includes a domain classifier, and the domain classifier is configured to distinguish between feature vectors outputted by the feature extractor (or the initial feature extractor) and feature vectors outputted by the feature generator. The second training module 830 is configured to perform a first parameter update and a second parameter update in each round of training of the generative adversarial network, the first parameter update including: assigning a first label to input of the feature extractor (or the initial feature extractor), and assigning a second label to input of the feature generator; calculating a first loss function value of the domain classifier; and updating parameters of the domain classifier according to the first loss function value; the second parameter update includes: blocking the input of the feature extractor (or the initial feature extractor), and assigning the first label to the input of the feature generator; calculating a second loss function value of the domain classifier; and updating parameters of the feature generator according to the second loss function value.

In an example embodiment, input of the initial feature generator includes a superposition of a priori data and noisy data, the a priori data being extracted from the second class samples of the first dataset, or the a priori data being extracted from samples in a second dataset that are of the same class as the second class samples.

In an example embodiment, the classification task model further includes a data cleaning unit, and the third training module is further configured to: filter out, by using the data cleaning unit, an abnormal feature vector outputted by the feature generator and the feature extractor.

In an example embodiment, the third training module is further configured to: select, by using the data cleaning unit from the feature vectors outputted by the feature generator and the feature extractor, a feature vector pair that meets a preset condition, the feature vector pair that meets the preset condition including two feature vectors with different labels and a similarity that is greater than a threshold; and filter out the feature vector pair that meets the preset condition as the abnormal feature vectors.

In an example embodiment, the first training module 810 is configured to: construct an initial classification task model, the initial classification task model including the initial feature extractor and an initial classifier; and train the initial classification task model by using the first dataset to obtain the feature extractor.

When the apparatus provided in the foregoing embodiments implements functions of the apparatus, the division of the foregoing functional modules is merely an example for description. In an embodiment, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 9:
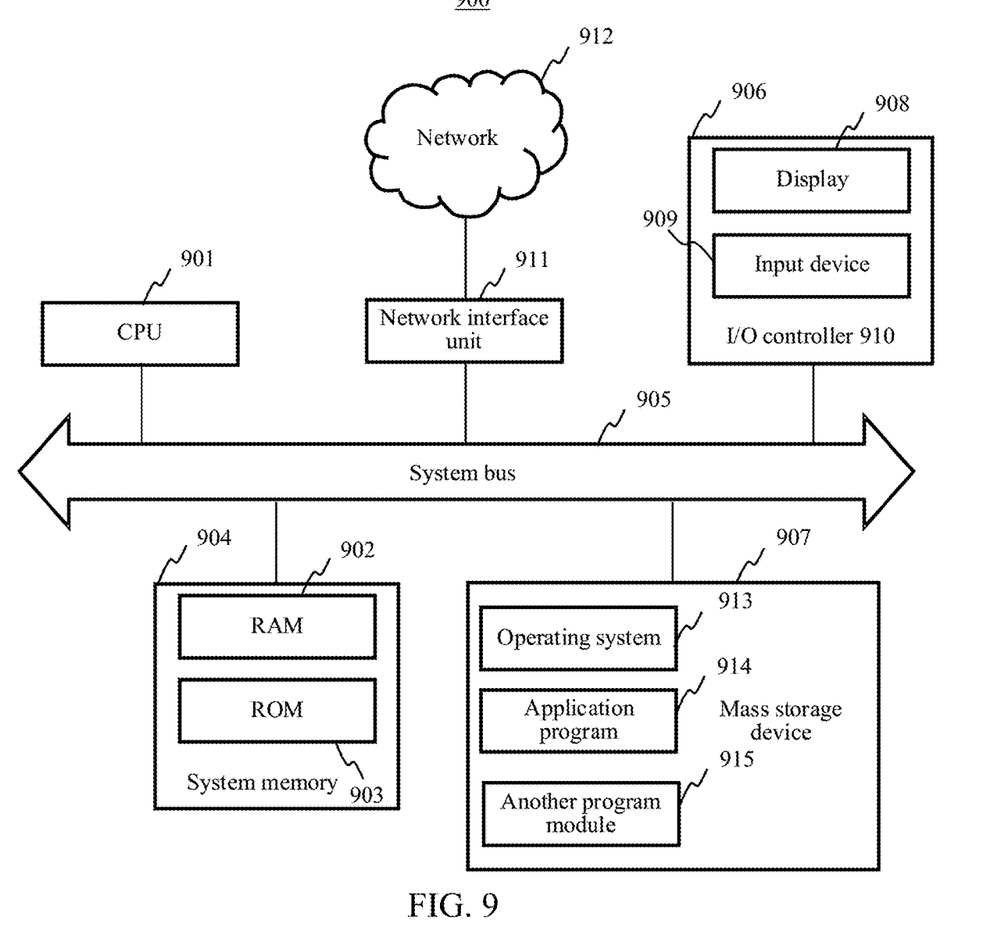
FIG. 9 is a schematic structural diagram of a computer device according to an embodiment of the disclosure.

FIG. 9 is a schematic structural diagram of a computer device according to an embodiment of the disclosure. The computer device may be any electronic device with a data processing function and a data storage function, for example, a PC or a server. The computer device is configured to perform the method for training a classification task model provided in the foregoing embodiments.

For example, the computer device 900 includes a central processing unit (CPU) 901, a system memory 904 including a random access memory (RAM) 902 and a read-only memory (ROM) 903, and a system bus 905 connecting the system memory 904 and the CPU 901. The computer device 900 further includes a basic input/output (I/O) system 906 configured to transmit information between components in a computer, and a mass storage device 907 configured to store an operating system 913, an application 914, and another program module 915.

The basic I/O system 906 includes a display 908 configured to display information, and an input device 909 used by a user to input information, such as a mouse or a keyboard. The display 908 and the input device 909 are both connected to the CPU 901 by using an I/O controller 910 connected to the system bus 905. The basic I/O system 906 may further include the I/O controller 910 for receiving and processing input from a plurality of other devices such as a keyboard, a mouse, an electronic stylus, or the like. Similarly, the I/O controller 910 further provides output to a display screen, a printer, or another type of output device.

The mass storage device 907 is connected to the CPU 901 through a mass storage controller (not shown) connected to the system bus 905. The mass storage device 907 and an associated computer-readable medium provide non-volatile storage for the computer device 900. In other words, the mass storage device 907 may include a computer-readable medium (not shown) such as a hard disk or a CD-ROM drive.

Without loss of generality, the computer-readable media may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. A person skilled in the art would learn that the computer storage medium is not limited to the foregoing several types. The system memory 904 and the mass storage device 907 may be collectively referred to as a memory.

According to the various embodiments of the disclosure, the computer device 900 may further be connected, through a network such as the Internet, to a remote computer on the network for running. That is, the computer device 900 may be connected to a network 912 by using a network interface unit 911 connected to the system bus 905, or may be connected to another type of network or a remote computer system (not shown) by using a network interface unit 911.

The memory stores at least one instruction, at least one section of program, a code set, or an instruction set, and the at least one instruction, the at least one section of program, the code set, or the instruction set is configured to be executed by one or more processors to implement the method for training a classification task model provided in the foregoing embodiments.

In an example embodiment, a computer-readable storage medium is further provided in the embodiments of the disclosure, the storage medium being configured to store a computer program, the computer program being configured to perform the method for training a classification task model provided in the foregoing embodiments. In an example embodiment, the computer-readable storage medium may be a ROM, a RAM, a CD-ROM, a magnetic tape, a floppy disk, an optical data storage device.

In an example embodiment, a computer program product is further provided, the computer program product, when executed, being configured to perform the method for training a classification task model provided in the foregoing embodiments.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" or "and/or" relationship between the associated objects. In addition, the operation numbers described in this specification merely illustratively show a possible execution sequence of the operations. In some other embodiments, the operations may not be performed according to the number sequence. For example, two operations with different numbers may be performed simultaneously, or two operations with different numbers may be performed according to a sequence contrary to the sequence shown in the figure. This is not limited in the embodiments of the disclosure.

The technical solutions provided in the embodiments of the disclosure include at least the following beneficial effects.

According to the technical solution provided in the embodiments of the disclosure, a feature generator is trained based on a generative adversarial network, and minority class samples (that is, training samples of a relatively small quantity in a class imbalanced dataset) are augmented in a feature space by using the feature generator. Augmentation is performed at a feature level instead of simply duplicating minority class samples by upsampling, so that a finally trained classification task model is prevented from overfitting and the accuracy of the final trained classification task model is improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely examples of the embodiments of the disclosure, but are not intended to limit the disclosure. Any modification, equivalent replacement, or improvement made without departing from the spirit and principle of the disclosure shall fall within the protection scope of the disclosure.

What is claimed is:

1. A method for training a classification task model, the method being performed by a computer device, the method comprising:

training an initial feature extractor by using a first dataset to obtain a feature extractor, the first dataset being a class imbalanced dataset comprising first class samples and second class samples, a quantity of the first class samples being greater than a quantity of the second class samples, wherein the first dataset includes medical images, the first class samples are images of legion regions, and the second class samples are images of non-legion regions;

constructing a generative adversarial network, the generative adversarial network comprising the feature extractor and an initial feature generator, an input of the initial feature generator including a superposition of a priori data, extracted based on the second class samples, and noisy data, and an output of the initial feature generator being a feature vector of a same dimension as a dimension of a feature vector output by the feature extractor;

training the generative adversarial network by using the second class samples to obtain a feature generator;

constructing a classification task model, the classification task model comprising the feature generator and the feature extractor; and training the classification task model by using the first dataset, the feature generator being configured to augment the second class samples in a feature space by performing augmentation at a feature level and transform a class imbalanced learning task to a class balanced learning task, in a training process of the classification task model, wherein the trained classification task model is configured to perform lesion classification on a medical image.

2. The method according to claim 1, wherein the generative adversarial network further comprises a domain classifier configured to distinguish between feature vectors outputted by the feature extractor and feature vectors outputted by the initial feature generator.

3. The method according to claim 2, wherein the training the generative adversarial network comprises, in each round of training of the generative adversarial network:
assigning a first label to an input of the feature extractor, and assigning a second label to an input of the initial feature generator;
calculating a first loss function value of the domain classifier; and
updating parameters of the domain classifier according to the first loss function value.

4. The method according to claim 3, wherein the training the generative adversarial network further comprises, in each round of the training of the generative adversarial network:
blocking the input of the feature extractor, and assigning the first label to the input of the initial feature generator;
calculating a second loss function value of the domain classifier; and
updating parameters of the initial feature generator according to the second loss function value.

5. The method according to claim 1, wherein
the a priori data are extracted from the second class samples of the first dataset, or the a priori data are extracted from samples, in a second dataset, that are of a same class as the second class samples.

6. The method according to claim 1, wherein the classification task model further comprises a data cleaning unit, and the training the classification task model comprises:
filtering out, by using the data cleaning unit, an abnormal feature vector outputted by the feature generator and the feature extractor.

7. The method according to claim 6, wherein the filtering out the abnormal feature vector comprises:
selecting, by using the data cleaning unit, from feature vectors outputted by the feature generator and the feature extractor, a feature vector pair comprising two feature vectors with different labels and a similarity between the two feature vectors being greater than a threshold; and
filtering out the feature vector pair.

8. The method according to claim 1, the training the initial feature extractor comprises:
constructing an initial classification task model, the initial classification task model comprising the initial feature extractor; and
training the initial classification task model by using the first dataset to obtain the feature extractor.

9. A computer device, comprising at least one processor and at least one memory storing program code, the program code being executable by the at least one processor to perform the method of claim 1.

10. An apparatus for training a classification task model, the apparatus comprising:
at least one memory configured to store program code; and
at least one processor configured to read the program code and operate as instructed by the program code, the program code comprising:
first training code configured to cause the at least one processor to train an initial feature extractor by using a first dataset to obtain a feature extractor, the first dataset being a class imbalanced dataset comprising first class samples and second class samples, a quantity of the first class samples being greater than a quantity of the second class samples, wherein the first dataset includes medical images, the first class samples are images of legion regions, and the second class samples are images of non-legion regions;
first construction code configured to cause the at least one processor to construct a generative adversarial network, the generative adversarial network comprising the feature extractor and an initial feature generator, an input of the initial feature generator including a superposition of a priori data, extracted based on the second class samples, and noisy data, and an output of the initial feature generator being a feature vector of a same dimension as a dimension of a feature vector output by the feature extractor;
second training code configured to cause the at least one processor to train the generative adversarial network by using the second class samples to obtain a feature generator;
second construction code configured to cause the at least one processor to construct a classification task model, the classification task model comprising the feature generator and the feature extractor; and
third training code configured to cause the at least one processor to train the classification task model by using the first dataset, the feature generator being configured to augment the second class samples in a feature space by performing augmentation at a feature level and transform a class imbalanced learning task to a class balanced learning task, in a training process of the classification task model,
wherein the trained classification task model is configured to perform lesion classification on a medical image.

11. The apparatus according to claim 10, wherein the generative adversarial network further comprises a domain classifier, the domain classifier being configured to distinguish between feature vectors outputted by the feature extractor and feature vectors outputted by the initial feature generator.

12. The apparatus according to claim 11, wherein the second training code is configured to cause the at least one processor to perform, in each round of training of the generative adversarial network:
assigning a first label to an input of the feature extractor, and assign a second label to an input of the initial feature generator;
calculating a first loss function value of the domain classifier; and
updating parameters of the domain classifier according to the first loss function value.

13. The apparatus according to claim 12, wherein the second training code is configured to cause the at least one processor to, in each round of training of the generative adversarial network:
blocking the input of the feature extractor, and assigning the first label to the input of the initial feature generator;
calculating a second loss function value of the domain classifier; and
updating parameters of the initial feature generator according to the second loss function value.

14. The apparatus according to claim 10, wherein
the a priori data are extracted from the second class samples of the first dataset, or the a priori data are extracted from samples, in a second dataset, that are of a same class as the second class samples.

15. The apparatus according to claim 10, wherein the classification task model further comprises a data cleaning unit, and the third training code is configured to cause the at least one processor to:

filter out, by using the data cleaning unit, an abnormal feature vector outputted by the feature generator and the feature extractor.

16. The apparatus according to claim 15, wherein the third training code is configured to cause the at least one processor to:
    select, by using the data cleaning unit, from feature vectors outputted by the feature generator and the feature extractor, a feature vector pair comprising two feature vectors with different labels and a similarity between the two feature vectors being greater than a threshold; and
    filter out the feature vector pair.

17. The apparatus according to claim 10, wherein the first training code is configured to cause the at least one processor to:
    construct an initial classification task model, the initial classification task model comprising the initial feature extractor; and
    train the initial classification task model by using the first dataset to obtain the feature extractor.

18. A non-transitory computer-readable storage medium storing a computer program, the computer program being executable by at least one processor to perform:
    training an initial feature extractor by using a first dataset to obtain a feature extractor, the first dataset being a class imbalanced dataset comprising first class samples and second class samples, a quantity of the first class samples being greater than a quantity of the second class samples, wherein the first dataset includes medical images, the first class samples are images of legion regions, and the second class samples are images of non-legion regions;
    constructing a generative adversarial network, the generative adversarial network comprising the feature extractor and an initial feature generator, an input of the initial feature generator including a superposition of a priori data, extracted based on the second class samples, and noisy data, and an output of the initial feature generator being a feature vector of a same dimension as a dimension of a feature vector output by the feature extractor;
    training the generative adversarial network by using the second class samples to obtain a feature generator;
    constructing a classification task model, the classification task model comprising the feature generator and the feature extractor; and
    training the classification task model by using the first dataset, the feature generator being configured to augment the second class samples in a feature space by performing augmentation at a feature level and transform a class imbalanced learning task to a class balanced learning task, in a training process of the classification task model,
    wherein the trained classification task model is configured to perform lesion classification on a medical image.

* * * * *